Oct. 4, 1966   S. PORTER, JR   3,276,905
COATING SYSTEM WHICH INCLUDES AN ACRYLIC LACQUER TOP COAT
Filed Oct. 19, 1961

INVENTOR.
SAMUEL PORTER JR
BY Oscar L. Spencer
ATTORNEY ure d States Patent Office 3,276,905
Patented Oct. 4, 1966

3,276,905
COATING SYSTEM WHICH INCLUDES AN ACRYLIC LACQUER TOP COAT
Samuel Porter, Jr., Tarentum, Pa., assignor to The Pittsburgh Plate Glass Company, Pittsburgh, Pa., a corporation of Pennsylvania
Filed Oct. 19, 1961, Ser. No. 146,271
22 Claims. (Cl. 117—75)

This invention relates to coating systems which include acrylic lacquer top coats. More particularly, this invention relates to coating systems comprising a top coat of acrylic lacquer and pigmented or unpigmented primer compositions, containing cellulose acetate butyrate.

The invention further relates to outstanding primer compositions containing an unsaturated carboxylic acid amide interpolymer and cellulose acetate butyrate.

Because methyl methacrylate lacquers composed of homopolymers and copolymers of methyl methacrylate form films having excellent gloss retention over long periods of exposure both outdoors and indoors, their use has become widespread, particularly in the automotive industry as finish coats for automobiles and other vehicles.

The expanding use of these methyl methacrylate lacquers, however, has given rise to many problems. The biggest problem encountered is the relatively poor adhesion of methyl methacrylate lacquers to metal surfaces, which in turn results in a low level of metal protection and a low level of rust inhibition of the painted metal surface. In order to overcome this shortcoming of methyl methacrylate lacquers, various primers have been developed which act as a bond between the lacquers and the metal surface. In other words, the chief requirement for the primer composition is that it have very good adhesion to both the metal substrate and to the top coat lacquer.

In choosing a suitable composition to be used as a primer, it is quite the exception to find one which will form a good, strong, adhesive bond between the primer and the top coat of methyl methacrylate lacquer composition. By their very nature, methyl methacrylate polymers have poor adhesion because they have no reactive polar groups such as are known to promote adhesion, and must rely primarily on mechanical adhesion.

In many instances, especially in the automotive industry, another composition is used as a surfacer over the primer, both of which are covered by a coat of lacquer. This surfacer composition is usually produced with a high pigment-to-binder ratio on the order of about 45 percent to 50 perecnt by volume of the binder or vehicle. This high pigment-to-binder ratio provides for a composition which may be used to fill any discontinuities in the surface of the substrate and also provides a surface which may be sanded to a smooth and level base for the top coat. Moreover, the sanded surface, because of the minute indentations from the sanding, provides much more surface area for contact between the top coat and the primer-surfacer substrate. It has been found that the sanded or unsanded surfaces of the primer-surfacer composition are far from satisfactory even though the adhesion between the primer-surfacer coating and the top coat is improved because these high pigment-to-binder ratios produce a surface which results in poor "hold-out" of the methyl methacrylate lacquer top coat; that is, the gloss of the top coat is decreased by the minute roughness of the surfacer. It is also well known that high pigment-to-binder ratio primer-surfaces lack the required protection against salt water corrosion and also lack flexibility and resistance to chipping when abraded.

It has now been discovered that small amounts (as little as 1 perecnt by weight based on a total resin solids) of cellulose acetate butyrate promotes adhesion of numerous resinous compositions to materials comprising mainly polymers of methyl methacrylate. Good acrylic adhesion is obtained with as little as from about ½ percent of the solids of cellulose acetate butyrate to about 30 percent by weight cellulose acetate butyrate. The preferred range, however, is from about 3 to about 20 percent by weight of cellulose acetate butyrate. While pigmentation of the primer composition is desirable, extremely good adhesion is obtained with very little or no pigment.

In accordance with the instant invention the acrylic top coats are superimposed directly over a cured baked resinous composition containing cellulose acetate butyrate, particularly the well-known baked thermoset vehicle containing automotive primer compositions.

Broadly, the present invention includes the use of cellulose acetate butyrate in any resinous composition to improve adhesion to acrylic lacquer type compositions. The invention is particularly concerned with the use of cellulose acetate butyrate to promote acrylic adhesion in curable compositions which may be used as primers for the acrylic lacquer compositions. The expression "curable" as used in the instant application is intended to include all resins which can be cross-linked through the action of heat with and without the presence of a catalyst; through the action of oxygen from the air with or without the aid of heat and/or a catalyst or drier, or through the presence of a resin having functional groups of sufficient activity to react upon aging with or without a catalyst. Curable resins are also commonly defined as those resins which have their melting point increased by application of progressively higher temperatures.

Preferably the invention is applied to drying oil modified alkyds, rosin modified alkyds, mixed or coreacted alkyds and amino-formaldehyde resins, mixed or coreacted alkyds and epoxy resins, mixed or coreacted alkyds, amino-formaldehyde resins and epoxy resins, mixed or coreacted higher fatty acid esters of epoxy resins with alkyds and/or amino-formaldehyde resins, mixed or coreacted aldehyde-modified unsaturated carboxylic acid amide interpolymers with any of the above, the thermosetting coreaction products of acid-containing acrylics with amino-formaldehylde resins and the like.

If the solvent system remains simple there is usually no problem with compatibility of the cellulose acetate butyrate with the various resins and resinous blends which are employed as acrylic primers. In many instances, however, good adhesion is obtained even where there is a slight incompatibility between the primer resin and the cellulose acetate butyrate.

It is also possible to add the cellulose acetate butyrate to emulsified resinous compositions by selecting the proper emulsified cellulose acetate butyrate composition.

Various cellulose acetate butyrates, which may be used in the practice of the instant invention, include those having at least 25 percent of the ester units substituted with the butyral residue. It is preferred, however, that at least 35 percent of the units be butyrate units. The following table sets forth various commercially available cellulose acetate butyrates which may be used with the compositions of the instant invention.

TABLE I

| Type No.[1] | Viscosity Range | | Average Acyl Content | | Color Maximum (p.p.m.) | Haze Maximum (p.p.m.) |
|---|---|---|---|---|---|---|
| | Seconds | Poises | Acetyl (Percent) | Butyryl (Percent) | | |
| EAB-272-3 | 2.4-3.6 | 9.0-13.5 | 20.5 | 26 | 175 | 35 |
| EAB-272-20 | 15-35 | 56-131 | 20.5 | 26 | 175 | 35 |
| Half-second | 0.3-0.5 | 1.28-2.08 | 13.0 | 37 | 125 | 35 |
| EAB-281-2 | 1-3.5 | 3.8-13.1 | 13.0 | 37 | 125 | 35 |
| EAB-381-20 | 17-33 | 64-124 | 13.0 | 37 | 125 | 35 |
| EAB-500-1 | 0.8-1.2 | 3.0-4.5 | 6.0 | 48 | 125 | 35 |
| EAB-500-5 | 4.0-6.0 | 15.0-22.5 | 6.0 | 48 | 125 | 35 |

[1] Trademarks of cellulose acetate butyrate sold by Eastman Kodak Company.

Viscosity—ASTM Method D-1343-56 (Formula A).
Color—Platinum-Cobalt Standard.
Haze—Arthur H. Thomas Fuller's Earth Standards.
Acetyl and Butyryl Content—ASTM Method D817-57.

When blending the various polymers of cellulose acetate butyrate, it is important that the solvent system be chosen with care. The following table sets forth the various solvent blends which may be employed effectively in intermixing the cellulose acetate butyrate with any one of the well-known resins.

TABLE II.—SOLUBILITY OF CELLULOSE ACETATE BUTYRATES IN VARIOUS SOLVENTS AND SOLVENT MIXTURES

| | 5% Solution | | | | | 20% Solution | | | | | |
|---|---|---|---|---|---|---|---|---|---|---|---|
| | AB-272-3 | AB-272-20 | AB-381-1&2 | EAB-381-20 | AB-500-1&5 | AB-272-3 | AB-272-20 | AB-381-1&2 | EAB-381-20 | AB-500-1&5 | |
| 1. Acetone | S | S | S | S | S | S | S | S | S | S | Ketones |
| 2. Methyl Ethyl Ketone | S | S | S | S | S | S | S | S | S | S | |
| 3. Methyl iso-Butyl Ketone | S | S | S | S | S | S | S | S | S | S | |
| 4. Diacetone Alcohol | S | S | S | S | S | S | S | S | S | S | |
| 5. Cyclohexanone | S | S | S | S | S | S | S | S | S | S | |
| 6. iso-Phorone | S | S | S | S | S | S | S | S | S | S | |
| 7. Methyl Acetate | S | S | S | S | S | S | S | S | S | S | Esters |
| 8. Ethyl Acetate | S | S | S | S | S | S | S | S | S | S | |
| 9. iso-Propyl Acetate | S | S | S | S | S | S | S | S | S | S | |
| 10. n-Butyl Acetate | S | S | S | S | S | S | S | S | S | S | |
| 11. n-Amyl Acetate | S | S | S | S | S | S | S | S | S | S | |
| 12. Methyl Cellosolve Acetate | S | S | S | S | S | S | S | S | S | S | |
| 13. Cellosolve Acetate | S | S | S | S | S | S | S | S | S | S | |
| 14. Ethyl Lactate | S | S | S | S | S | S | S | S | S | S | |
| 15. Methylene Chloride | S | S | S | S | S | S | S | S | S | S | |
| 16. Ethylene Chloride | S | S | S | S | S | S | S | S | S | S | |
| 17. Propylene Chloride | IBG | BSG | S | S | S | ISG | BSG | S | BSG | S | Chlorinated Hydrocarbons |
| 18. Chloroform | S | S | S | S | S | S | S | S | S | S | |
| 19. Tetrachloroethane | S | S | S | S | S | S | S | S | S | S | |
| 20. Trichloroethylene | IGG | I | BSS | BBG | S | IGG | I | BSS | B | S | |
| 21. Carbon Tetrachloride | I | I | I | I | ISS | I | I | I | I | ISS | |
| 22. Nitromethane | S | S | S | S | S | S | S | S | S | S | Nitroparaffins |
| 23. Nitroethane | S | S | S | S | S | S | S | S | S | S | |
| 24. 2-nitropropane | S | S | S | BSS | S | S | S | S | S | S | |
| 25. Methyl Cellosolve | S | S | S | S | S | S | S | S | S | BSS | |
| 26. Cellosolve | S | S | S | S | BSS | S | S | S | S | BSS | |
| 27. Butyl Cellosolve | BSS | IBG | ISS | BSS | BSS | BSG | IBB | ISS | B | BBG | Ether Alcohols |
| 28. Carbitol | BSS | B | IBB | B | I | BSG | IBB | ISS | B | I | |
| 29. Butyl Carbitol | S | BSS | BSS | B | B | BSS | IBB | BSS | B | B | |
| 30. Dioxane | S | S | S | S | S | S | S | S | S | S | |
| 31. Dichloroethyl Ether | S | S | S | S | S | BSS | S | S | S | S | Ethers |
| 32. Ethyl Ether | I | I | I | I | I | I | I | I | I | I | |
| 33. iso-Propyl Ether | I | I | I | I | I | I | I | I | I | I | |
| 34. Methyl Alcohol | ISI | ISI | ISI | BSS | ISG | ISG | ISG | ISG | BSG | IBG | |
| 35. 3-A ethyl Alcohol | ISG | ISG | ISI | IBG | IBG | ISG | ISG | ISG | IBG | IBG | Alcohols |
| 36. iso-Propyl Alcohol | I | I | ISI | IBG | ISG | I | I | ISG | IBG | ISG | |
| 37. n-Butyl Alcohol | I | I | I | I | IBG | I | I | IBI | IBI | IBG | |
| 38. Water | I | I | I | I | I | I | I | I | I | I | |
| 39. Benzene | I | I | BSS | IBB | S | I | I | BSS | BBG | S | |
| 40. Toluene | I | I | I | I | ISG | I | I | IBG | I | IBG | |
| 41. Cyclohexane | I | I | I | I | I | I | I | I | I | I | Hydrocarbons |
| 42. Solvent Naphtha #3 | I | I | I | I | I | I | I | I | I | I | |
| 43. V.M. & P. Naphtha | I | I | I | I | I | I | I | I | I | I | |
| 44. Turpentine | I | I | I | I | I | I | I | I | I | I | |
| 45. Castor Oil | I | I | I | I | I | I | I | I | I | I | Miscellaneous |
| 46. Mineral Oil | I | I | I | I | I | I | I | I | I | I | |
| 47. Acetone-Methanol 4:1 | S | S | S | S | S | S | S | S | S | S | Ketone-Alcohol Mixtures |
| 48. Acetone-Methanol 1:1 | S | S | S | S | S | S | S | S | S | S | |
| 49. Acetone-Methanol 1:4 | S | S | S | S | B | S | S | S | S | S | |
| 50. Ethyl Acetate-Ethanol 4:1 | S | S | S | S | S | S | S | S | S | S | Ester-Alcohol Mixtures |
| 51. Ethyl Acetate-Ethanol 1:1 | S | S | S | S | S | S | S | S | S | S | |
| 52. Ethyl Acetate-Ethanol 1:4 | S | S | S | S | BSS | S | S | S | BSS | BSS | |
| 53. Methylene Chloride-Methanol 4:1 | S | S | S | S | S | S | S | S | S | S | |
| 54. Methylene Chloride-Methanol 1:1 | S | S | S | S | S | B | S | S | S | S | |
| 55. Methylene Chloride-Methanol 1:4 | S | B | S | S | IBB | S | S | S | BSS | IBB | Chlorinated Hydrocarbon-Alcohol Mixtures |
| 56. Ethylene Chloride-Methanol 4:1 | S | S | S | S | S | S | S | S | S | S | |
| 57. Ethylene Chloride-Methanol 1:1 | S | S | S | S | S | S | S | S | S | S | |
| 58. Ethylene Chloride-Methanol 1:4 | S | S | S | S | S | S | S | S | S | S | |
| 59. Propylene Chloride-Methanol 4:1 | S | S | S | S | S | S | S | S | S | S | |
| 60. Propylene Chloride-Methanol 1:1 | S | S | S | S | S | S | S | S | S | S | |
| 61. Propylene Chloride-Methanol 1:4 | S | S | S | S | S | S | S | S | BSS | BSS | |
| 62. Nitroethane-Ethanol 4:1 | S | S | S | S | S | S | S | S | S | S | Nitroparaffin-Alcohol Mixtures |
| 63. Nitroethane-Ethanol 1:1 | S | S | S | S | S | S | S | S | S | S | |
| 64. Nitroethane-Ethanol 1:4 | S | S | S | S | S | S | S | S | S | S | |

TABLE II—Continued

| | 5% Solution | | | | | 20% Solution | | | | | |
|---|---|---|---|---|---|---|---|---|---|---|---|
| | AB-272-3 | AB-272-20 | AB-381-1&2 | EAB-381-20 | AB-500-1&5 | AB-272-3 | AB-272-20 | AB-381-1&2 | EAB-381-20 | AB-500-1&5 | |
| 65... Benzene-Methanol 4:1 | S | S | S | S | S | S | S | S | S | S | Aromatic Hydrocarbon-Alcohol Mixtures. |
| 66... Benzene-Methanol 1:1 | S | S | S | S | S | S | S | S | S | S | |
| 67... Benzene-Methanol 1:4 | S | S | S | S | BSS | S | S | S | S | BSS | |
| 68... Toluene-Methanol 4:1 | S | S | S | S | S | S | S | S | S | BSS | |
| 69... Toluene-Methanol 1:1 | S | S | S | S | BSS | S | S | S | S | BSG | |
| 70... Toluene-Methanol 1:4 | S | S | S | BSS | IBB | S | S | S | BSS | IBB | |

Legend:
 S—Completely soluble, no grain or insoluble particles.
 B—Borderline solubility, grainy or partly soluble (definite increase in viscosity).
 G—Semigel, clear gel or white gel.
 I—Insoluble or swollen.
 Where only one letter appears, there is no essential difference in solubility at different temperatures.
 Where three letters appear, the first indicates solubility at room temperature, the second at elevated temperatures and the third indicates solubility when cooled back to room temperature.

The coating system of the instant invention is depicted in the accompanying drawing illustrating a metal substrate coated with a primer containing cellulose acetate butyrate and an acrylic lacquer superimposed on the primer.

Figure 1:
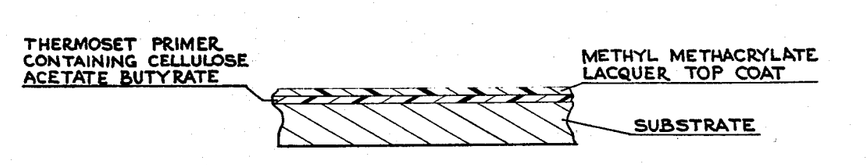

The primer coat compositions of the instant invention may be employed with any methyl methacrylate type lacquer. The constituents of the lacquer may be varied in kind and/or in proportion by means which are well known to the art, and those which are set forth in the following description are only representative of a wide variety of such lacquers which may be used in the coating system of the instant invention.

While homopolymers of an alkyl methacrylate, particularly methyl methacrylate or ethyl methacrylate, may be utilized, a particularly useful and preferred group of polymethyl methacrylate copolymers which may be employed in the preparation of top coat lacquers are copolymers of methyl methacrylate with at least 10 percent by weight of another alkyl ester of an unsaturated carboxylic acid, such as acrylic acid, methacrylic acid, itaconic acid, and the like. The full and detailed description of these resinous compositions is more fully set forth in copending application Serial No. 584,474 filed May 14, 1956, and application Serial No. 108,292 filed May 8, 1961, now U.S. Patent No. 3,194,777.

The modifying monomer, that is, the alkyl ester of an unsaturated carboxylic acid, is preferably utilized in an amount of about 10 percent to about 30 percent by weight, and the methyl methacrylate, 70 to 90 percent by weight. However, amounts as high as 50 percent by weight of the alkyl ester also may be utilized to give copolymers which impart the desired characteristics of coating compositions. The exact quantity of the alkyl ester of an unsaturated carboxylic acid employed will depend, of course, on the particular ester utilized; for example, those monomers with the most plasticizing ability, such as ethyl acrylate, butyl acrylate, octyl acrylate, lauryl methacrylate and decyl-octyl methacrylate should be used in smaller amounts. Broadly, the alkyl groups may contain from 2 to 18 carbon atoms; preferably, however, they should contain at least 8 carbon atoms. Lauryl methacrylate is particularly preferred.

The copolymers of methyl methacrylate and alkyl methacrylate in which the alkyl group contains at least 8 carbon atoms should possess a relative viscosity ($N_r$) in the range of 1.150 to 1.260, and preferably 1.180 to 1.250, to function satisfactorily in coating compositions. Relative viscosity (also known as viscosity ratio) is defined as follows:

$$N_r = \frac{\text{efflux time of polymer solution in seconds}}{\text{efflux time of solvent solution in seconds}}$$

The efflux times are measured in accordance with the procedure of A.S.T.M. D–445–46T (Method B) using as the oil of said procedure (1) a solution of 0.25 gram of the methyl methacrylate copolymer in 50 cc. of ethylene dichloride, and (2) a sample of the ethylene dichloride utilized in making the solution. The determinations are run at 25° C. in an Ostwald Viscometer, Series 50.

The above relative viscosity range of 1.150 to 1.260 corresponds to a molecular weight in the range of about 87,000 to 150,000. The equation utilized in determining molecular weight is as follows, wherein the constants for polymethyl methacrylate are employed:

$$M.W. = 1.47 \times 10^6 (N_r - 1 - 1nN_r)^{0.65}$$

where $$N_r = \frac{\text{efflux time of polymer solution in seconds}}{\text{efflux time of solvent solution in seconds}}$$

The following is the preparation of a methyl methacrylate copolymer which may be used in the acrylic lacquer top coats of the instant invention.

Example A

A bead polymer of methyl methacrylate and lauryl methacrylate was prepared as follows:

A mixture of 1495 parts by weight of water and 5 parts of an acetylated starch (Kofilm No. 50) was heated with agitation to 80° C. until an almost clear solution was obtained. Fifty (50) parts of buffer solution (prepared by admixing 1 part sodium dihydrogen phosphate, 17 parts disodium hydrogen phosphate and 100 parts water) was added. To the resulting mixture was added a mixture of 450 parts methyl methacrylate, 50 parts lauryl methacrylate, 5 parts benzoyl peroxide, and 6.25 parts of tertiary dodecyl mercaptan. The resulting polymerization mixture was then heated with agitation to 75° C. to 80° C. for 3 hours, after which the mixture was cooled to 30° C., filtered, washed with water and dried at 140° F. for 16 hours. Clear beads of polymer were obtained. When dissolved to a total solids content of 36 percent in toluene, the polymer solution had a Gardner-Holdt viscosity of S.

The following examples relate to the preparation of acrylic lacquer top coats prepared from the above-described interpolymer.

Example B

A pigment paste was made from the following materials:

| | Parts by weight |
|---|---|
| Titanium dioxide pigment (Tipure R–610) | 405.0 |
| Suspending agent* alkyl ammonium montmorillonite (Bentone 34) | 56.7 |
| 35% solution of the polymer of Example A in methylethyl ketone | 163.2 |

*Any one of the well-known suspending agents such as other members of the Bentone series, MPA (Baker Castor Oil Company), and aluminum stearate may be used.

The above ingredients were charged into a Baker-Perkins mill and ground for 20 minutes and then charged into a pebble mill with more of the same solution of the polymer of Example A (275 parts), Cellosolve acetate (96.7 parts), and methylethyl ketone (99.8 parts) and ground for 16 hours.

*Example C*

A white lacquer was prepared according to the following formulation:

| | Parts by weight |
|---|---|
| Pigment paste of Example B | 300.0 |
| 36.5% solution of the resin of Example A in toluene | 395.0 |
| Butyl benzyl phthalate | 7.5 |
| Dicyclohexyl phthalate | 15.0 |
| 12% 5–6 second nitrocellulose solution containing 5% ethyl alcohol, 40% toluene and 43% butyl acetate | 41.5 |
| Butyl acetate | 26.0 |
| Toluene | 28.8 |
| Xylene | 21.6 |
| Cellulose acetate | 8.0 |
| 1% DC 200 silicone solution in toluene | 0.25 |

The above ingredients were homogeneously admixed until a desired lacquer consistency was obtained.

The aldehyde-modified unsaturated carboxylic acid amide interpolymer compositions disclosed and claimed in copending application Serial No. 749,583, filed July 21, 1958, now U.S. Patent No. 3,037,963, are particularly compatible with the various cellulose acetate butyrate resins. It has been found that the adhesion of the various acrylic lacquers to primers comprising mainly these resins is extremely good and the coating systems comprising these primers for acrylic lacquer top coats have all of the qualities which are demanded by the automotive industry.

In the preparation of the aldehyde-modified amide interpolymer resin a polymerizable unsaturated carboxylic acid amide is polymerized with one or more ethylenically unsaturated monomers, and the resulting interpolymer reacted with an aldehyde.

In the event the aldehyde is utilized in the form of a solution in butanol or other alkanol, etherification will take place so that at least some of the methylol groups in the above structure will be converted to groups of the structure wherein R is selected from the class consisting of hydrogen and a saturated lower aliphatic hydrocarbon radical having its free valences on a single carbon atoms, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to the unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol or cyclic alcohol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

Minor amounts of the ether resins may be blended advantageously with the aldehyde-modified interpolymers of the instant invention. Examples of these other resins include alkyd resins (U.S. Patent 2,940,945), epoxy resins (U.S. Patent 2,870,117), vinyl halide resins (U.S. Patent 2,870,116) and nitrocellulose (U.S. Patent 2,940,943).

The carboxylic acid amide interpolymer resin prepared according to the disclosures in the above-identified patents is reacted with an aldehyde, preferably in the presence of an alcohol.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example N-butoxymethyl acrylamide, with one or more of the $CH_2=C<$ monomers set forth hereinabove. This method, described in copending application Serial No. 775,380, filed November 21, 1958, now U.S. Patent No. 3,079,434, does not require reaction of the polymer with an aldehyde since the N-alkoxyalkyl amide monomers already contain groups, wherein R and $R_1$ have the meaning set forth above.

In application Serial No. 775,380 there is disclosed also the preparation of the unsaturated carboxylic acid amide interpolymers by emulsion techniques. In accordance with the instant invention, cellulose acetate butyrate may be advantageously blended with the interpolymers prepared in this manner to obtain compositions which when cured as a film have exceptionally good adhesion to acrylic lacquers.

Where the aforementioned aldehyde-modified carboxylic acid amide interpolymers are to be employed as primers for automotive finishes, it is preferable that low temperature curing compositions be employed because much of the existing equipment which is used by the automotive industry to cure the coatings of the present invention cannot produce temperatures much above 250° F. It has been found that when the aldehyde-modified unsaturated carboxylic acid amide interpolymers are blended with an adduct of a hydroxyl-containing polymer and a carboxylic acid anhydride, the curing temperatures are lowered to below 300° F. and even to about 250° F.

In a copending application, Serial No. 39,240, filed June 28, 1960, now U.S. Patent No. 3,118,853, there is disclosed the preparation of these mixtures which may be employed for low temperature curing of the aldehyde-modified amide interpolymers; and in application Serial No. 677,778, filed August 9, 1957, now U.S. Patent No. 3,050,495, there is disclosed the various blends of the resins of the instant invention with melamine-formaldehyde resins.

It is preferred that the adduct of a hydroxyl-containing polymer of carboxylic acid anhydride be employed in amounts ranging from about 10 percent to about 20 percent by weight of the primer composition; but, however, they may be employed in amounts of as little as 5 percent by weight to about 35 percent by weight. Amounts higher than 35 percent by weight tend to lessen the thermosetting properties of the interpolymer.

In addition to the above-mentioned adducts, melamine-formaldehyde or urea-formaldehyde also may be used to lower the curing temperature, particularly where some carboxyl groups are present in the said aldehyde-modified interpolymer. Amounts within the range of about 5 percent to about 25 percent may be advantageously employed to reduce the curing temperature to about 250° F.

The following examples illustrate in detail the preparation of the resinous compositions which may be employed in the resinous primer compositions of the instant invention. These examples are given by way of illustration and not by way of limitation. All parts and percentages are by weight unless otherwise specified.

Example D

The following materials were charged into a vessel equipped with stirrer, condenser and temperature measuring means:

| | Parts by weight |
|---|---|
| Allyl alcohol-styrene copolymer (Shell X–450)— OH equivalent per 100 grams—0.45; hydroxyl groups per mole—5.2 | 85.3 |
| Maleic anhydride | 14.7 |
| Methylethyl ketone | 33.3 |

The above components were refluxed until the product had an acid value of 60–64 (about 4 to 8 hours). The product was then diluted to 50 percent solids with toluene, the resulting resinous product having the following analysis:

| | |
|---|---|
| Solids (percent) | 50.0 |
| Hydroxyl value | 65.0 |
| Acid value | 42.0 |
| Viscosity (Gardner-Holdt) | E–F |

Example E

Example D was repeated substituting succinic anhydride for the maleic anhydride of the example. The reaction was carried out in such a way as to react the succinic anhydride with about 40 percent of the available hydroxyl groups of the allyl alcohol-styrene copolymer. The resulting product had a Gardner-Holdt viscosity of W and an acid value of 41.0.

The unsaturated carboxylic acid amides which are condensed with an aldehyde and subsequently etherified in an alcohol are prepared simply by refluxing the amide and the other comonomers in the presence of one of the aforementioned catalysts such as cumene hydroperoxide and a chain transfer agent in an alcoholic solution or in an alcoholic hydrocarbon solvent mixture (about 50 to 100 percent based on the weight of the reactant monomers). After about 60 percent to 70 percent of the monomers have been converted, formaldehyde in the form of paraformaldehyde or an alkyl Formcel (40 percent butyl alcohol solution of formaldehyde) is added with a small amount of maleic anhydride. In order to obtain maximum conversion of the reactive monomers it is usually necessary to add a catalyst (cumene hydroperoxide) during the course of the polymerization (every one or two hours), the reason being that the said catalyst is used up during the reaction. Amounts of about ½ percent to 1 percent based on the monomer solids should be added after each 1- to 2-hour interval. As previously mentioned, it has proved advantageous to blend minor amounts (5 to 10 percent by weight) of an epoxy resin with the said unsaturated carboxylic acid amide interpolymer. This may be done by hot or cold blending. The reaction mass is then refluxed with an azeotropic distillation for a substantial length of time (about 3 hours) to remove the water of reaction. The following table sets forth the components of various aldehyde-modified carboxylic acid amide interpolymers which have been prepared by this process.

TABLE III

| | Example No. (Parts by Weight) | | | | | | | |
|---|---|---|---|---|---|---|---|---|
| | F | G | H | I | J[1] | K | L | M |
| Materials | | | | | | | | |
| Acrylamide | 150.0 | 225.0 | 405.0 | 2.0 | 2.0 | 30.0 | 30.0 | 3.0 |
| Styrene | 375.0 | 577.5 | 2,227.5 | 13.5 | 5.0 | 130.5 | 262.5 | 7.7 |
| Ethyl acrylate | 975.0 | 660.0 | | | 11.8 | 132.0 | | |
| Methyl methacrylate | | | | | | | | 8.8 |
| Acrylonitrile | | | | 4.0 | | | | |
| Methacrylic acid | | 37.5 | 67.5 | 0.6 | 1.2 | 7.5 | 7.5 | 0.5 |
| Tertiary dodecyl mercaptan | 15.0 | 22.5 | 54.0 | 0.8 | 0.2 | 3.75 | 3.75 | 0.6 |
| Cumene hydroperoxide | 45.0 | 37.5 | 96.0 | 0.5 | 0.4 | 9.0 | 9.0 | 0.5 |
| Butyl Formcel | 318.0 | 477.0 | 857.5 | 4.2 | 4.2 | 63.6 | 63.6 | 6.3 |
| Maleic anhydride | 4.3 | 6.0 | 11.5 | 0.05 | 0.05 | 0.8 | 0.8 | 0.08 |
| Epon solution (75% Epon 1001 in xylene) | 116.5 | | | | | | | |
| Solvesso 150 | 808.5 | | | | | | | |
| Butanol | 750.0 | 750.0 | 1,350.0 | 10.0 | 20.0 | 75.0 | 75.0 | 10.0 |
| Epon 1001 (solid) | | 187.0 | 337.0 | | | | | |
| Toluene | | 937.0 | 1,525.0 | 10.0 | | 150.0 | 150.0 | 10.0 |
| Xylene | | | | | | 75.0 | 75.0 | |
| Properties | | | | | | | | |
| Solids | 50±2% | 50±2% | 50±2% | 50±2% | 48–52 | 50±2% | 50±2% | 50±2% |
| Viscosity (Gardner-Holdt) | S–U | T–U | S–U | V–W | V–Y | U–W | U–W | V–Y |
| Color (Gardner) | 6 max | 3–4 | <3 | | Under 7 | 4 max | 3 max | |
| Wt./Gal. (lbs.) | 8±.1 | 8.04 | 8±.1 | | 8.17 | 8.1±.1 | 8.1±.1 | |
| Acid value | 2 max | 6.5–7.5 | | 8–9 | 16.4 | 7–9 | 6–8 | |

[1] Eleven (11) parts of Example J were distilled off. To this portion was added Bakelite 2002 (1.1 parts), xylene (1.1 parts) and aromatic naptha (Solvesso 150) (10 parts).

The following examples set forth the preparation of various pigment pastes using the aldehyde-modified unsaturated carboxylic acid amide interpolymers of Table III.

Example N

| | Parts by weight |
|---|---|
| Red iron oxide pigment | 264 |
| Barytes | 1490 |
| Aluminum silicate | 180 |

Example N—Continued

| | Parts by weight |
|---|---|
| Talc (magnesium silicate) | 132 |
| Suspending agent, ammonium alkyl montmorillonite (Bentonite 34) | 24 |
| Product of Example H | 700 |
| Xylene | 710 |

The above ingredients were ground for 16 hours in a steel ball mill.

Example O

| | Parts by weight |
|---|---|
| Red iron oxide pigment | 266 |
| Barytes | 1530 |
| Aluminum silicate | 182 |
| Talc (magnesium silicate) | 136 |
| Suspending agent (Bentone 34) | 27 |
| Product of Example F | 700 |
| Solvesso 100 (high boiling aromatic hydrocarbon naphtha) | 630 |

The above ingredients were ground for 16 hours in a steel ball mill.

Example P

| | Parts by weight |
|---|---|
| Lithopone | 2940 |
| Lampblack (Molacco black) | 30 |
| Suspending agent, polyethylene (multipurpose additive, Baker Oil Company) | 30 |
| Product of Example F | 320 |
| Solvesso 100 (high boiling aromatic hydrocarbon naphtha) | 680 |

The above ingredients were ground for 16 hours in a steel ball mill. Five hundred (500) parts more of the product F were then added to the steel ball mill as letdown and the ingredients were ground for another hour to effect homogeneity.

Example Q

| | Parts by weight |
|---|---|
| Lithopone | 294 |
| Lampblack (Molacco black) | 3 |
| Suspending agent (multipurpose additive, Baker Castor Oil Company) | 3 |
| Product of Example J | 32 |
| Solvesso 100 (high boiling aromatic hydrocarbon naphtha) | 68 |

The above ingredients were charged into a steel ball mill and ground for 16 hours. Fifteen (15) parts more of the product of Example J were added as letdown and the mixture was ground for another hour to effect homogeniety.

Example R

| | Parts by weight |
|---|---|
| Lithopone | 294 |
| Lampblack (Molacco black) | 3 |
| Multipurpose additive (Baker Castor Oil Company) | 3 |
| Cellosolve acetate | 68 |
| Xylene | 25 |
| Product of Example L | 32 |

The above ingredients were charged into a steel ball mill and ground for 16 hours. Fifty (50) parts more of the product of Example L were added as letdown and the mixture was ground for another hour to effect homogeneity.

Example S

| | Parts by weight |
|---|---|
| Lithopone | 294 |
| Lampblack (Molacco black) | 3 |
| Suspending agent, polyethylene (mulitpurpose additive, Baker Castor Oil Company) | 3 |
| Epoxy ester resinous composition (55% solids in xylene solution, containing 40% low rosin tall oil, 5% dimer acids and 55% Epon 1004, solution acid no. of 7 and Gardner-Holdt viscosity of Q–T) | 56 |
| Cellosolve acetate | 70 |

The above ingredients were charged into a steel ball mill and ground for 16 hours. One hundred (100) parts more of the alkyd epoxy resin were added as letdown and the mixture was ground for another hour to effect homogeneity.

Example T

| | Parts by weight |
|---|---|
| Lampblack pigment (Molacco black) | 30 |
| High boiling aromatic solvent (Solvesso 100) | 676 |
| Suspending agent (multipurpose additive from Baker Castor Oil Company) | 30 |
| Product of Example G | 324 |
| Lithopone (70% barium sulfate and 30% zinc sulfide) | 2940 |

The above ingredients were ball milled for 16 hours in a pebble mill after which 500 parts more of the resinous product of Example G were added as holdout and the mixture was further ground for another half hour to obtain homogeneity. The resulting paste contained 67 percent pigment and 9.2 percent of the resinous product of Example G.

Example U

A pigment paste was made up as follows:

| | Parts by weight |
|---|---|
| Lithopone (70% barium sulfate and 30% zinc sulfide | 294 |
| Suspending agent (multipurpose additive from Baker Castor Oil Company) | 3 |
| Resinous product of Example H | 32 |
| Lampblack pigment (Molacco black) | 3 |
| High boiling aromatic solvent (Solvesso 100) | 68 |

The above ingredients were mixed in a mill for 15 minutes, after which 50 parts more of the resinous product of Example F was added as holdout to the said mixture. The mixture was then further ground for 15 minutes to effect homogeneity of the mixture.

Example V

| | Parts by weight |
|---|---|
| Lampblack pigment (Molacco black) | 30 |
| Lithopone (70% barium sulfate and 30% zinc sulfide) | 267 |
| Suspending agent (multipurpose additive from Baker Castor Oil Company) | 3 |
| Alkyd resin, 50% solids (55% glycerol phthalate, 39.1% dehydrated castor oil, 2.4% paratertiary butyl benzoic acid and 3.5% glycerol) | 90 |
| High boiling aromatic solvent (Solvesso 100) | 68 |

The above ingredients were mixed in a pebble mill for 16 hours to effect intimate grinding. Resulting paste had 67 percent pigment and 10 percent of the alkyd resin.

Example W

| | Parts by weight |
|---|---|
| Barytes | 835.0 |
| Lithopone | 288.0 |
| Lampblack pigment (Molacco black) | 28.8 |
| Product of Example K | 120.0 |
| Cellosolve acetate | 263.0 |

The above ingredients were charged into a steel ball mill and ground for 24 hours. One hundred forty-three and two-tenths (143.2) parts more of the product of Example K were added as washout and the mixture was ground for another hour to effect homogeneity.

The compositions of the following Table IV were adjusted to a suitable viscosity and sprayed on phosphatized steel panels (Bonderite 100) in sufficient amounts to produce a smooth, dry, uniform coating; about 1.2 mils thick. The panels were then baked at a temperature of about 275° F. for 45 minutes. The compositions of Examples X through XIV were baked at 350° F. for 20 minutes. The coated panels were then cooled, sprayed with two different acrylic lacquers (Duracryl and Lucite) and baked to a film thickness of about 2 mils at 225° F. for 30 minutes. All of the panels manifested excellent acrylic adhesion, excellent mandrel bend and excellent cold bend. The acrylic adhesion was tested by three different methods; the crosshatch method, the knife method, and the tape method.

The crosshatch method comprises cutting a series of parallel lines about 1/16 inch apart in the coating surface and another series of parallel lines over the same area but perpendicular to the first set of parallel lines. The amount of chipping observed is a measure of the adhesion.

The knife method comprises gouging a groove into the surface of the coating with the flat tip of the knife and observing the manner in which the coating is removed. If the adhesion is poor, the coating will break freely away from the substrate.

The tape method comprises cutting an "X" in the surface of the coating with a knife, adhering a pressure-sensitive tape against the X surface and removing the said tape in a rapid motion almost parallel to the plane of the surface. The amount of coating which comes off with the tape is also a measure of the adhesion of the coating.

The mandrel bend test comprises placing the coated panel on a standard conical mandrel and rolling and bending the said panel intimately around the cone. If the adhesion is poor the coating will peel from the tapered end of the cone.

The cold bend test comprises bending the coated panel around a cylindrical mandrel at temperatures below freezing (0° F.) wherein both the mandrel and the panel have been maintained below freezing for at least an hour.

The adhesion of acrylic lacquers to primers made from the compostion of Table IV without the use of any cellulose acetate butyrate is extremely poor and in many instances nonexistent.

TABLE IV

| Example | Aldehyde-Modified Unsaturated Carboxylic Acid Amide Parts by Weight | Adduct of a Dicarboxylic Acid and Hydroxyl-Containing Polymer Parts by Weight | Pigment Paste Parts by Weight | Cellulose Acetate Butyrate Parts by Weight | Solvent Parts by Weight | Other Materials Parts by Weight |
|---|---|---|---|---|---|---|
| I | Product of Ex. F, 10% acrylamide, 25% styrene, 65% acrylamide, +5% Epon 1001; 72. | Product of Ex. D, Maleic anydride adduct of a styreneallyl alcohol copolymer, 50. | Product of Ex. P, 374. | 20% ½ sec. CAB [1] solution in 7:2:1 xylene, butanol, methylethyl ketone mixture; 30. | Cellosolve acetate, 74. | |
| II | Product of Ex. G, 15% acrylamide, 39% styrene, 44% ethyl acrylate, 2% methacrylic acid; 72. | Product of Ex. D, 20. | Product of Ex. S 374. | 20% ½ sec. CAB solution in 1:1 methyl isobutyl ketone, mixture toluene; 50. | Methyl isobutyl ketone, 70; xylene, 94. | |
| III | Product of Ex. H, 15% acrylamide, 82.5% styrene, 2.5% methacrylate; 66. | do | Product of Ex. N 416. | 20% ½ sec. CAB solution in xylene. butanol, methylethyl ketone 75. | Methyl isobutyl ketone, 70. High boiling aromatic hydrocarbon solvent (Solvesso 100) 67. | |
| IV | Product of Ex. I, 10% acrylamide, 20% acrylonitrile, 67.5% styrene, 2.5% methacrylic acid; 150. | do | | do | Cellosolve acetate 55. | |
| V | Product of Ex. J, 10% acrylamide, 59% ethyl acrylate, 25% styrene, 6% methacrylic acid. | | Product of Ex. Q 374. | 20% ½ sec. CAB solution in 7:2:1 xylene, butanol, methylethyl ketone mixture; 50. | Cellosolve acetate, 60. Methyl isobutyl ketone, 54. | Melamine-formaldehyde resin, 20. |
| VI | Product of Ex. K, 10% acrylamide, 43.5% styrene, 44% ethyl acrylate, 2.5% methacrylic acid; 83. | Product of Ex. D, 30. | Product of Ex. W, 362. | ½ sec. CAB (15.6 parts) solution in Cellosolve acetate (15.3 parts) and toluene (69.2 parts), 25. | Cellosolve acetate, 15. Diacetone alcohol, 30. Toluene, 30. | Paraplex G-60, 10.0. |
| VII | Product of Ex. L, 10% acrylamide, 87.5% styrene, 2.5% methacrylate; 72. | Product of Ex. D, 20. | Product of Ex. R, 394. | 20% ½ sec. CAB solution in 7:2:1 xylene, butanol, methylethyl ketone mixture, 50. | Cellosolve acetate, 70. Xylene, 34. | Do. |
| VIII | Product of Ex. M., 15% acrylamide, 38.5% styrene, 44% methyl methacrylate, 2.5% methacrylic acid; 80. | Product of Ex. D, 5. | | 20% solution in Cellosolve acetate toluene, 5. | | Paraplex G-60, 15.0. |
| IX | Product of Ex. K, 10% acrylamide, 43.5% styrene, 44% ethyl acrylate, 2.5% methacrylic acid; 165.5. | Product of Ex. D 59.9. | Product of Ex. W, 722. | ½ sec. CAB (15.6 parts) solution in Cellosolve acetate (15.3 parts) and toluene (69.2 parts), 50. | Diacetone alcohol, 89. Toluene, 60. | Paraplex G-60, 20.5. |
| X | Product of Ex. K, 10% acrylamide, 43.5% styrene, 44% ethyl acrylate, 2.5% methacrylic acid; 170. | | | 20% ½ sec. CAB solution in 7:2:1 xylene, butanol, methylethyl ketone mixture; 25. | Cellosolve acetate, 70. Toluene, 69. | Paraplex G-60, 10.0. |
| XI | Product of Ex. K, 10% acrylamide, 43.5% styrene, 44% ethyl acrylate, 2.5% methacrylic acid; 170. | | | 20% CAB (EAB 381-2) solution in 7:2:1 xylene, butanol, methylethyl ketone mixture; 25. | Cellosolve acetate 70. Toluene, 69. | Paraplex G-60, 10. |
| XII | Product of Ex. K, 10% acrylamide, 43.5% styrene, 44% ethyl acrylate, 2.5% methacrylic acid; 170. | | | 15% CAB (EAB 500-1) solution in acetone, 33. | do | Do. |
| XIII | Product of Ex. K, 10% acrylamide, 43.5% styrene, 44% ethyl acrylate, 2.5% methacrylic acid; 170. | | | 20% CAB (EAB 500-5) solution in 7:2:1 xylene, butanol, methylethyl ketone mixture; 25. | do | Do. |
| XIV | Product of Ex. F, 10% acrylamide, 25% styrene, 65% acrylamide, +5% Epon 1001; 190. | | | ½ sec. Cellulose acetate butyrate, 5 (solids). | | |
| XV | Product of Ex. G, 15% acrylamide, 39% styrene, 44% ethyl acrylate, 2% methacrylic acid; 160. | | | ½ sec. Cellulose acetate butyrate, 20 (solids). | | |
| XVI | Product of Ex. J, 10% acrylamide, 59% ethyl acrylate, 25% styrene, 6% methacrylic acid; 90. | | | ½ sec Cellulose acetate butyrate, 10 (solids). | | |

[1] CAB—Cellulose acetate butyrate.

The adhesion of the various epoxy resins to various acrylic lacquers is also promoted by the presence of similar amounts of cellulose acetate butyrate therewith.

The epoxy resin which is utilized in the primer compositions of this invention may vary considerably in chemical structure. These materials, which are ordinarily polyglycidyl ethers of bisphenols, or polyether derivatives of polyhydric phenols containing epoxide groups, are formed by the reaction of bisphenols with epichlorohydrin, and range from viscous liquids to hard, brittle resins.

The epoxy resins may advantageously be reacted with monocarboxylic acids, particularly the fatty acids such as those obtained from linseed oil, soya oil, safflower oil, perilla oil, tung oil, oiticica oil, poppyseed oil, sunflower oil, tall oil, walnut oil, dehydrated castor oil, herring oil, menhaden oil, sardine oil, and the like. The epoxy resins may be esterified simply by refluxing the epoxy resin in the presence of one or more of the carboxylic acids while simultaneously removing water azeotropically.

In addition to the epoxy resins which are prepared with a polyhydric phenol and a chloroepoxy compound, the epoxidized ring compounds such as disclosed in U.S. Patent 2,716,123 may also be used. Union Carbide's EP-201 is an example of the commercially available epoxidized ring compounds.

A representative epoxy resin structure may be illustrated as follows:

In the foregoing structure, $n$ is a number of a magnitude dependent upon the degree to which the etherification is carried. The most simple epoxy resin will be free of functional groups other than epoxide and hydroxyl groups, and will contain at least 4 carbon atoms, as illustrated by 1,2-epoxy-3,4-epoxy butane. More complex epoxy resins, such as those which result from the reaction of two or more moles of a diepoxide with one mole of a dihydric phenol, or from the reaction of three or more moles of a diepoxide with one mole of a trihydric phenol, and diepoxides or polyepoxides derived by polyhydric alcohols such as sorbitol, pentaerythritol, or polyallyl alcohols, may also be used. Among the many phenolic compounds utilized in the preparation of epoxy resins are included the following:

Bis(4-hydroxy-phenyl)2,2-propane
4,4'-Dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-phenyl)2,2-propane
Bis(4-hydroxy-tertiary butyl phenyl)2,2-propane
Bis(2-hydroxy-naphthyl)methane
1,5-Dihydroxy-naphthalene The epoxy component of the epoxy resins may be selected from compounds of the following group:

1-Chloro-2,3-epoxy propane (epichlorohydrin)
1-Chloro-2,3-epoxy butane
1-Chloro-3,4-epoxy butane
2-Chloro-3,4-epoxy butane
1-Chloro-2-methyl-2,3-epoxy butane
1-Bromo-2,3-epoxy pentane
2-Chloromethyl-1,2-epoxy butane
1-Bromo-4-methyl-3,4-epoxy pentane
1-Bromo-4-ethyl-2,3-epoxy pentane
4-Chloro-2-methyl-2,3-epoxy pentane
1-Chloro-2,3-epoxy octane
1-Chloro-2-methyl-2,3-epoxy octane
1-Chloro-2,3-epoxy decane Those epoxide resins which are liquids are particularly preferred for the use in the primer compositions of this invention. The liquid epoxide resins normally possess epoxide equivalents (grams of resin containing one gram equivalent of epoxide) below about 300. The liquid resins ordinarily will be of an average molecular weight below 500 and preferably in the range of about 350 to 450. While the liquid resins are much preferred, the solid resins can also be utilized, although compatibility problems are sometimes encountered, making production of the primer considerably more difficult than is the case with the liquid epoxide resins.

It has been found that where adhesion between the various epoxy primers such as those set forth in U.S. Patent 2,847,323 is good, it can still be enhanced by the presence of small amounts of the various cellulose acetate butyrates.

The various polyester resins and alkyd resins may also be blended advantageously with cellulose acetate butyrate to promote adhesion to acrylic lacquers in accordance with the instant invention. These include the various reaction products of the dicarboxylic acids and anhydrides and various polyols with and without long chain fatty acid esters. Particular acids and anhydrides which may be used with the instant invention are phthalic acid, maleic acid, fumaric acid, succinic acid, adipic acid, tetrahydrophthalic acid, hexahydrophthalic acid, terphthalic acid, and isophthalic acid. Among the polyols (alcohols) which may be employed in preparing the polyester and alkyd resins of the instant invention are included glycerine, pentaerythritol, sorbitol, mannitol, ethylene glycol, diethylene glycol, propylene glycol, 2,3-butylene glycol and the like. All of the alkyd resins such as short oil modified resins, medium oil modified resins and long oil modified resins may also be blended with cellulose acetate butyrate to improve their adhesion to acrylic lacquers. Various oils which may be used to modify the alkyd resins include linseed oil, soya oil, safflower oil, perilla oil, tung oil, oiticica oil, poppyseed oil, sunflower oil, tall oil, walnut oil, dehydrated castor oil (DCO), herring oil, menhaden oil, sardine oil, and the like.

The various styrene-modified alpha, beta-ethylenically unsaturated dicarboxylic acid alkyds, particularly the maleic acid type, may be blended with minor amounts of cellulose acetate butyrate and subsequently cast or laminated into various forms. These castings have good adhesion to acrylic lacquers.

Adhesion between acrylic lacquers and the various amino-formaldehyde resins such as urea-formaldehyde and melamine-formaldehyde resins is also promoted by the presence of minor amounts of cellulose acetate butyrate. The fast-curing melamine-formaldehyde resins which are employed in acrylic lacquer primers for the automotive industry are particularly adaptable for blending with cellulose acetate butyrate. These fast-curing melamine-formaldehyde resins are characterized by melamine which has been methylolated to a limited degree (about 3 to 4 methylol groups per melamine molecule) and further etherified with an alkanol such as butanol to the minimum degree necessary to improve its solubility in the various hydrocarbon solvents and hydrocarbon polar solvent blends.

While it is preferred that fast-curing melamine-formaldehyde resins be employed, the cellulose acetate butyrate may also be advantageously blended with melamine-formaldehyde resins which are derived from hexamethoxy melamine where the maximum of methylolation and etherification has taken place on the melamine molecule.

Where the urea-formaldehyde resins are employed, cellulose acetate butyrate may be advantageously blended with both the low-curing and fast-curing urea-formaldehyde resins. The ability of the urea-formaldehyde resins to cure is controlled in the same manner as that which is used to control the curing of the melamine-formaldehyde resins.

The various thermosetting compositions which are prepared from blends of acid-containing vinyl resins or halide-containing vinyl resins with melamine-formaldehyde or urea-formaldehyde resins may also be blended advantageously with cellulose acetate butyrate. Examples of these compositions which may be found commercially are Rohm and Haas' AT-50 and AT-51.

The blends of the above-described epoxy, polyester, alkyd and amino-formaldehyde resins with the aforementioned unsaturated carboxylic acid amide interpolymers may be effectively modified with cellulose acetate butyrate to improve their acrylic adhesion. Moreover, blends of the thermoplastic acrylic polymers with the said interpolymers may be utilized with cellulose acetate butyrate.

The following examples relate to the preparation of epoxy resin primers, epoxy-alkyd resin primers, epoxy and melamine-formaldehyde resin primers.

Example X

| | Parts by weight |
|---|---|
| $TiO_2$ | 49.3 |
| $BaSO_4$ | 248.5 |
| Clay | 53.8 |
| Carbon black pigment | .5 |
| Antisettling agent (Troykyd) | 2.7 |
| Proprietary varnish (Beckasol, chinawood oil modified phenol-formaldehyde—10 gal. oil per 100 lbs. phenol-formaldehyde resin) | 35.0 |
| Lecithin solution (phospholipid of soya oil, aromatic solvent) | 5.4 |
| Xylene | 25.6 |
| Butyl Cellosolve | 13.5 |
| Aromatic hydrocarbon solvent, boiling point 220–270° F. (Hansol) | 19.5 |

The above ingredients were charged into a pebble mill and ground for 20 hours (Hegman 7). Then 81.1 parts of 45% solution in hydrogenated naphtha (Union 30 or Solvesso 2) of an alkyd resin comprising 21.25% soya oil, 21.25% tung oil, 56.7% glycerol phthalate, 0.8% excess glycerine (Gardner-Holdt viscosity U–V, acid No. 19) and ground for ½ hour, and thinned in the mill.

The following ingredients were then added to the reaction mixture:

| | Parts by weight |
|---|---|
| Xylene | 26.7 |
| Hansol (high boiling aromatic petroleum, boiling point 140° C.–185° C.) | 50.5 |
| Epoxy ester solution (60% solids in xylene—32% fractionated cottonseed acid, iodine value of 132 minimum, 68% Epon 1004—acid No. 6, Gardner-Holdt viscosity Z) | 39.4 |

The ingredients were ground for another hour and the following were added:

| | Parts by weight |
|---|---|
| Alkyd resin solution (45% solids in hydrogenated naphtha solvent—solids, 21.25% soya oil, 21.25% tung oil, 56.7% glycerol phthalate, 0.8% excess glycerine—Union 30 or Solvesso 2, acid No. 19 and Gardner-Holdt viscosity U–V) | 271.3 |
| Phenol formaldehyde resin | 16.4 |
| High naphtha tolerance alkylated urea-formaldehyde solution (60% solids in 1:4 xylene-butanol mixture, high naphthal tolerance—10 gms. in 36–40 ml. aliphatic hydrocarbon naphtha) | 18.0 |
| Naphthenate mixture (containing 10.5% Pb, .66% Co and .67% Mn in aliphatic hydrocarbon) | 3.5 |
| Cobalt naphthenate (4%) | 5.5 |
| Manganese naphthenate (6% aliphatic hydrocarbon) | 1.1 |
| Cresylic acid | 3.6 |
| Hansol (aromatic petroleum, boiling point 140–185° C.) | 68.5 |
| Enjay 2 | 18.8 |

Example Y

| | Parts by weight |
|---|---|
| Esterified epoxy resin [55% solids in xylene solvent (solution acid No. 7, Gardner-Holdt viscosity V–W), 40% low rosin tall oil acids, 5% dimer acids *, 55% Epon 1004] | 111 |
| Aliphatic hydrocarbon solvent | 106 |
| Mineral spirits | 60 |
| Barium sulfate (bleached barytes) | 196 |
| Hydrite clay aluminum silicate | 62 |
| Zinc oxide | 13 |
| Zinc potassium chromate ($ZnKCrO_3$) | 42 |
| Lecithin solution | 4 |
| Anti-settling agent (Troykyd) | 2 |
| Barium sulfate | 24 |
| $Fe_2O_3$ pigment (Indian red) | 18 |
| Carbon black pigment | 8 |

*Dimer acids are dimerized reaction products of linoleic and oleic acid in the presence of steam; iodine value is in the range of from 80–95.

The above ingredients were charged into a suitable vessel and ground 14 hours. It was ground for 24 hours (Hegman 6.9). Forty-six (46) more parts of the above esterified epoxy resin were added and ground ½ hour, another 47 parts of the esterified epoxy resin were added and ground another ½ hour. The mixture was thinned and to the reaction mass was added the following ingredients:

| | Parts by weight |
|---|---|
| Pigment paste prepared above | 739 |
| Esterified epoxy resin [55% solids in xylene solvent (acid No. 7, Gardner-Holdt viscosity V–W), 40% low rosin tall oil acids, 5% dimer acids, 55% Epon 1004] | 103 |
| Resimene 875 (melamine-formaldehyde, fast-curing) | 8 |
| Cresylic acid | 1 |
| Manganese drier | 1½ |
| Butyl Cellosolve | 14 |
| Hydrocarbon solvent (Enjay 160) | 89 |
| Aliphatic hydrocarbon, boiling point 160–205 (Shell TS 28) | 73 |

The resulting composition had a solids content of 53% and a viscosity (77° F. sec.) of 45.

Example Z

| | Parts by weight |
|---|---|
| Red iron oxide pigment | 70.8 |
| Carbon black pigment | 1.8 |
| Magnesium silicate talc | 42.7 |
| Barytes | 138.1 |
| Lithopone | 88.3 |
| Zinc oxide | 17.5 |
| Chrome green | 17.5 |
| Troykyd | 3.0 |
| Lecithin solution (50 percent) | 4.9 |
| Velsicol 45 (high boiling aromatic hydrocarbon solvent, boiling point 220° F. to 270° F.) | 51.4 |
| Xylene | 64.0 |
| Cresylic acid | 1.0 |
| Alkyd resin [50% solids in xylene, solids: 39.1% glycerol ester of dehydrated castor oil, 2.4% glycerol ester of p-tertiary butyl benzoic acid, 55% glycerol phthalate, 3.5% excess glycerine] | 33.0 |

The above ingredients were ground for 20 hours to Hegman 7 and an additional 72.8 parts of the same alkyd resin were added. This was then mixed for 1 hour and blended with the following ingredients:

| | Parts by weight |
|---|---|
| Alkyd resin [50% solids in xylene, solids: 39.1% glycerol ester of dehydrated castor oil, 2.4% glycerolester of p-tertiary butyl benzoic acid, |

| | |
|---|---|
| 55% glycerol phthalate, 3.5% excess glycerine] | 132.2 |
| Castor oil alkyd (60% solids in xylene) | 68.0 |
| Epoxy ester [60% solids in xylene (32% fractionated cottonseed acid, iodine value of 132 minimum, 68% Epon 1004), acid No. 6, Gardner-Holdt viscosity Z] | 72.8 |
| Urea-formaldehyde resin [60% solids in 20% xylene, 80% butanol, high naphtha tolerance, 10 gm. in 36–40 ml. of naphtha aliphatic hydrocarbon] | 30.1 |
| Iron naphthenate (6% iron in mineral spirits) | 4.8 |
| Diethylene diamine | 2.0 |
| Butyl alcohol | 25.3 |
| Butyl Cellosolve | 23.2 |
| Velsicol 45 | 69.9 |
| Xylene | 48.8 |

It has been found that minor amounts of cellulose acetate butyrate also promote adhesion between acrylic lacquer top coats and certain compositions which were not intended to be used as primers for acrylic lacquers. For instance, water-base resins such as those prepared from adducts of a dicarboxylic anhydride and a drying oil may be employed as a primer for acrylic lacquers through addition of cellulose acetate butyrate.

The adducts are prepared by reacting a drying oil, a semidrying oil or a long oil alkyd with an unsaturated dicarboxylic acid or anhydride to form water soluble resins. Generally, the drying oils are those oils which have an iodine value above about 130, and the semidrying oils are those which have an iodine value of about 90 to 130 as determined by method ASTM-D 1467–57T. Included among these oils are linseed oil, soya oil, safflower oil, perilla oil, tung oil, oiticica oil, poppyseed oil, sunflower oil, menhaden oil, sardine oil, and the like. Also included among such oils are those in which the oils per se are modified with other acids such as phthalic acid (or anhydride) or benzoic acid by first forming a di- or monoglyceride or a mixture thereof by alcoholysis, followed by esterification. Polyols other than glycerol can also be employed in the alcoholysis. Other esters of unsaturated fatty acids; for example, those prepared by the esterification of tall oil fatty acids with polyols are also useful. In addition, long oil alkyds having low hydroxyl value (greater than 70 percent oil length) using the oils mentioned above are also useful. All of these materials can be reacted with unsaturated dicarboxylic acid anhydrides to give adducts useful in preparing the compositions of this invention. Preparation of these compositions is set forth in detail in copending application Serial No. 815,789 filed May 26, 1959. A typical preparation of these materials is set forth in the following example.

Example ZZ

Thirty and four-tenths (30.4) parts (76 percent) of linseed oil and 9.6 parts (24 percent) of maleic anhydride were placed in a reactor and heated to a temperature of 375° F. The heat was then turned off and since the reaction was strongly exothermic, the temperature rose to 475° F. After approximately 2½ hours, the reaction mixture was added with stirring to a mixture of 10.5 parts of 28 percent aqueous ammonium hydroxide and 1.88 parts of 2-methyl-2-amino-1,3-propanediol and 49.5 parts of water. The composition had a U-X viscosity on the Gardner-Holdt scale and a solids content of 43 percent. The Gardner Color was 14–16 and the weight per gallon 8.7 pounds. The pH of the composition was 8.5. A sample of the resin formed a clear solution in water at a pH of 7.5 without the use of water soluble organic solvents.

In order to effectively blend cellulose acetate butyrate with a water base composition such as that prepared in the above example, the following cellulose acetate butyrate emulsion may be prepared:

Example ZZZ

| Solution A: | Parts by weight |
|---|---|
| ½-second cellulose acetate butyrate | 20 |
| Methyl isopropyl ketone | 24 |
| Xylene | 56 |
| Solution B: | |
| Water | 144 |
| Tergitol dispersant MPX | 6 |

The above solutions were blended in a Cowles dissolver until a creamy emulsion was obtained.

The following table sets forth compositions which were adjusted to a suitable viscosity and sprayed on phosphatized steel panels (Bonderite 100) in sufficient amounts to produce a smooth, dry, uniform coating (about 1.2 mils). The panels were baked for 20 minutes at 350° F., cooled and sprayed with two different lacquers (Duracryl L707 and Lucite) to a film thickness of about 2 mils. However, the panels made from the alkyd resin and the Rohm and Haas AT-51 vinyl type resins were baked at 275° F. for 45 minutes and 300° F. for 30 minutes respectively. They were then baked for 30 minutes at 225° F. The adhesion of the coating system was then tested by the previously described crosshatch method, knife method and tape method. In each instance adhesion between the top coat and the primer was much better than for corresponding systems which were prepared using primer compositions not containing cellulose acetate butyrate.

TABLE V

| Ex. Number | Resin | Parts by Weight Resin | Parts Cellulose Acetate Butyrate | Cellulose Acetate Butyrate | Solvent |
|---|---|---|---|---|---|
| XVII | Product of Ex. X (Epoxy ester-alkyd resin and urea-formaldehyde resin vehicle). | 100 | 25 | 10% ½ sec. CAB in 7:2:1 methyl isobutyl ketone, butanol, xylene mixture. | Methyl isobutyl ketone, 20. |
| XVIII | Product of Ex. Y (Epoxy ester-melamine-formaldehyde resin vehicle). | 100 | 25 | do | Do. |
| XIX | Product of Ex. Z (Epoxy ester-alkyd resin and urea-formaldehyde vehicle). | 100 | 25 | do | Do. |
| XX | Alkyd resin (60% solids in toluene comprising 51.1 parts glycerol ester of castor oil, 46 parts glycerol phthalate, excess glycerine 2.9 parts). | ¹ 80 | ¹ 20 | do | |
| XXI | Product of Ex. ZZ | 100 | | 8% Cellulose acetate butyrate emulsion of Ex. ZZZ. | |
| XXII | Blend of 65 parts of product of Ex. K+25 parts alkyd+10 parts of product of Ex. A. | 90 | 25 | 20% ½ sec. CAB in 7:2:1 methyl isobutyl ketone, butanol, xylene mixture. | |
| XXIII | Thermoset vinyl resin (Rohm & Haas AT-51) | 90 | 50 | do | |
| XXIV | Blend of 40 parts of product of Ex. K+60 parts of product of Ex. A. | 105 | ¹ 3 | | Cellosolve acetate, 20. |
| XXV | Blend of 45 parts (solids) of product of Ex. K, 45 parts (solids) interpolymer of 64 percent methyl methacrylate, 30 percent dibutyl itaconate and 6 percent methacrylic acid. | | ¹ 3 | | |

¹ Solids.

Although specific examples have been set forth hereinabove, it is not intended that the invention be limited solely thereto, but to include all of the variations and modifications falling within the scope of the appended claims.

I claim:
1. A metal article having a hard, adherent, crack-resistant coating comprising a layer of primer and a superimposed layer of a polymer of an alkyl methacrylate, said primer comprising (1) a heat hardenable resinous composition comprising an interpolymer containing from about 2 to 50 percent by weight of an unsaturated carboxylic acid amide in polymerized form based on the total weight of said interpolymer and being characterized by having at least one hydrogen atom of an amido nitrogen replaced by the structure:

wherein R is a member selected from the group consisting of hydrogen and lower alkyl and R₁ is a member selected from the group consisting of hydrogen, lower alkyl and alkoxyethyl and (2) cellulose acetate butyrate.

2. The article of claim 1 in which said alkyl methacrylate is methyl methacrylate.

3. The article of claim 1 in which said primer contains an acrylic resin as an additional component.

4. A multiple layer coating system comprising a substrate, a layer of primer and a superimposed adherent layer of a lacquer comprising as the sole methacrylate polymer a polymer selected from the group consisting of homopolymers of an alkyl methacrylate, and copolymers of an alkyl methacrylate with 10 to 30 percent by weight of another alkyl ester of an unsaturated carboxylic acid, said primer being a layer of a coating composition comprising an epoxy resin and cellulose acetate butyrate.

5. The coating system of claim 4 wherein the said epoxy resin is the reaction product of epichlorohydrin and para, para'-isopropylidine diphenol.

6. The coating system of claim 4 wherein the epoxy resin has been esterified.

7. The coating system of claim 6 wherein the said esterified epoxy resin has been esterified with a long chain fatty acid.

8. A multiple layer coating system comprising a substrate, a layer of primer and a superimposed adherent layer of a lacquer comprising as the sole methacrylate polymer a polymer selected from the group consisting of homopolymers of an alkyl methacrylate, and copolymers of an alkyl methacrylate with 10 to 30 percent by weight of another alkyl ester of an unsaturated carboxylic acid, said primer being a layer of a coating composition comprising an alkyd resin and cellulose acetate butyrate.

9. The coating system of claim 8 wherein the alkyd resin is the reaction product of glycerine, dehydrated castor oil, phthalic acid and para-tertiary butyl benzoic acid.

10. The coating system of claim 8 wherein the alkyd resin is the reaction product of soya oil, tung oil, glycerine and phthalic acid.

11. A multiple layer coating system comprising a substrate, a layer of primer and a superimposed adherent layer of a methyl methacrylate lacquer in which the sole methacrylate polymer is selected from the group consisting of poly (methyl methacrylate) and copolymers of methyl methacrylate with 10 to 30 percent by weight of another alkyl ester of an unsaturated carboxylic acid, said primer being a layer of a coating composition comprising an amino-formaldehyde resin and cellulose acetate butyrate.

12. The coating system of claim 11 wherein the amino-formaldehyde resin is melamine-formaldehyde resin.

13. The coating system of claim 11 wherein the amino-formaldehyde resin is urea-formaldehyde resin.

14. A multiple layer coating system comprising a substrate, a layer of primer and a superimposed adherent layer of methyl methacrylate lacquer in which the sole methacrylate polymer is selected from the group consisting of poly (methyl methacrylate) and copolymers of methyl methacrylate with 10 to 30 percent by weight of another alkyl ester of an unsaturated carboxylic acid, said primer being a layer of a coating composition comprising the resin of a reaction product of an unsaturated carboxylic acid containing vinyl resin and an amino-formaldehyde resin and cellulose acetate butyrate.

15. A multiple layer coating system comprising a substrate, a layer of primer and a superimposed adherent layer of methyl methacrylate lacquer in which the sole methacrylate polymer is selected from the group consisting of poly (methyl methacrylate) and copolymers of methyl methacrylate with 10 to 30 percent by weight of another alkyl ester of an unsaturated carboxylic acid, said primer being a layer of a coating composition comprising the adduct of a member selected from the group consisting of an unsaturated dicarboxylic acid and anhydride and a member selected from the group consisting of drying oils, semidrying oils and long oil alkyd resins and cellulose acetate butyrate.

16. The coating system of claim 15 wherein the said adduct is an adduct of maleic anhydride and linseed oil.

17. The coating system of claim 3 wherein the acrylic resin is a copolymer of methyl methacrylate and lauryl methacrylate and the said interpolymer is an interpolymer of acrylamide, styrene, ethyl acrylate and methacrylic acid.

18. The coating system of claim 3 wherein the acrylic resin is a copolymer of methyl methacrylate, dibutyl itaconate and methacrylic acid and the said interpolymer is an interpolymer of acrylamide, styrene, ethyl acrylate and methacrylic acid.

19. The article of claim 1 in which the primer contains an alkyd resin as an additional component.

20. The article of claim 1 in which said primer contains an alkyd resin and an epoxy resin as additional components.

21. A multiple layer coating system comprising a substrate, a layer of primer and a superimposed adherent layer of methyl methacrylate lacquer in which the sole methacrylate polymer is selected from the group consisting of poly (methyl methacrylate) and copolymers of methyl methacrylate with 10 to 30 percent by weight of another alkyl ester or an unsaturated carboxylic acid, said primer being a layer of a coating composition comprising a blend of an epoxy resin, a melamine-formaldehyde resin and cellulose acetate butyrate.

22. A multiple layer coating system comprising a substrate, a layer of primer and a superimposed adherent layer of methyl methacrylate lacquer in which the sole methacrylate polymer is selected from the group consisting of poly (methyl methacrylate) and copolymers of methyl methacrylate with 10 to 30 percent by weight of another alkyl ester of an unsaturated carboxylic acid, said primer being a layer of a coating composition comprising a blend of an epoxy ester resin, a melamine-formaldehyde resin, alkyd resin and cellulose acetate butyrate.

References Cited by the Examiner
UNITED STATES PATENTS

| | | | |
|---|---|---|---|
| 2,782,131 | 2/1957 | Johnson | 117—75 X |
| 2,864,722 | 12/1958 | Millar et al. | 117—72 |
| 2,866,720 | 12/1958 | Martin et al. | 117—72 |

(Other references on following page)

UNITED STATES PATENTS

| | | | |
|---|---|---|---|
| 2,873,210 | 2/1959 | Barrett et al. | 117—75 |
| 2,949,383 | 8/1960 | Blake | 117—75 X |
| 2,955,055 | 10/1960 | Souder et al. | 117—75 |
| 2,956,902 | 10/1960 | Greif | 117—75 |
| 3,008,847 | 11/1961 | Berge | 117—75 |
| 3,055,851 | 9/1962 | Sanderson | 260—17 |
| 3,070,558 | 12/1962 | Coover | 260—17 |
| 3,096,203 | 7/1963 | Levine | 117—75 |

OTHER REFERENCES

Paist: Cellulosics, Reinhold, New York, 1958, pp. 164–166 TP986A2P33.C.3.

ALFRED L. LEAVITT, *Primary Examiner.*

RICHARD D. NEVIUS, MURRAY KATZ, *Examiners.*

R. S. KENDALL, J. P. McINTOSH, W. L. SOFFIAN, *Assistant Examiners.*